(12) United States Patent
Howard et al.

(10) Patent No.: US 11,570,341 B2
(45) Date of Patent: Jan. 31, 2023

(54) LIGHTING DEVICE AND METHOD OF USING THE SAME

(71) Applicant: CINELED, Marina Del Rey, CA (US)

(72) Inventors: Thomas Howard, Marina Del Rey, CA (US); Eric Forand, Ada, MI (US)

(73) Assignee: Cineled, Inc., Marina Del Rey, CA (US)

( * ) Notice: Subject to any disclaimer, the term of this patent is extended or adjusted under 35 U.S.C. 154(b) by 0 days.

(21) Appl. No.: 16/308,389

(22) PCT Filed: Jun. 21, 2017

(86) PCT No.: PCT/US2017/038553
§ 371 (c)(1),
(2) Date: Dec. 7, 2018

(87) PCT Pub. No.: WO2017/223204
PCT Pub. Date: Dec. 28, 2017

(65) Prior Publication Data
US 2019/0268518 A1    Aug. 29, 2019

Related U.S. Application Data

(60) Provisional application No. 62/353,114, filed on Jun. 22, 2016.

(51) Int. Cl.
*H04N 5/225*     (2006.01)
*F21V 29/87*     (2015.01)
(Continued)

(52) U.S. Cl.
CPC ............. *H04N 5/2256* (2013.01); *F21V 7/28* (2018.02); *F21V 17/105* (2013.01);
(Continued)

(58) Field of Classification Search
CPC .... H04N 5/2256; H04N 5/225; H04N 5/2251; F21V 29/00; F21V 29/87; F21V 7/28;
(Continued)

(56) References Cited

U.S. PATENT DOCUMENTS 2,682,603 A * 6/1954 Dine ....................... G03B 15/05
362/16
4,777,566 A * 10/1988 Lowell ................... G03B 15/02
362/18
(Continued)

FOREIGN PATENT DOCUMENTS

CN        200999992 Y     1/2008

OTHER PUBLICATIONS

Hagan., "Out There Images", <URL=http://www outthereimages.com/09_07_newsletter.html>, Jul. 2009; especially p. 4—2nd Figure and Caption.
(Continued)

*Primary Examiner* — Tsion Tumebo
(74) *Attorney, Agent, or Firm* — Eandi Fitzpatrick LLP

(57) ABSTRACT

The present disclosure provides a lighting apparatus and method of using the same. The lighting apparatus has a base having a bottom and at least one sidewall, the base having a hollow center, the hollow center being dimensioned for a camera lens, a ribbon of light emitting didoes (LEDs) affixed to the base, wherein the ribbon of LEDs are parallel the sidewall and configured for color temperature between approximately two thousand seven hundred degrees and six thousand degrees, a lens cover coupled to the sidewall of the base, wherein opaque lens is coupled to the sidewall modularly such that a no tooling is required.

20 Claims, 9 Drawing Sheets

(51) Int. Cl.
*F21V 7/28* (2018.01)
*F21V 17/10* (2006.01)
*F21V 21/08* (2006.01)
*F21V 23/00* (2015.01)
*F21V 31/04* (2006.01)
*F21V 29/00* (2015.01)
*F21Y 103/33* (2016.01)
*F21Y 113/13* (2016.01)
*F21Y 115/10* (2016.01)
*F21W 131/406* (2006.01)

(52) U.S. Cl.
CPC ........ *F21V 17/108* (2013.01); *F21V 21/0832* (2013.01); *F21V 23/003* (2013.01); *F21V 29/00* (2013.01); *F21V 29/87* (2015.01); *F21V 31/04* (2013.01); *H04N 5/225* (2013.01); *H04N 5/2251* (2013.01); *F21W 2131/406* (2013.01); *F21Y 2103/33* (2016.08); *F21Y 2113/13* (2016.08); *F21Y 2115/10* (2016.08)

(58) Field of Classification Search
CPC .. F21V 17/105; F21V 17/108; F21V 21/0832; F21V 23/003; F21V 31/04; F21V 33/0052; F21Y 2103/33; F21Y 2113/13; F21Y 2115/10; F21W 2131/406
See application file for complete search history.

(56) References Cited

U.S. PATENT DOCUMENTS

| | | | | |
|---|---|---|---|---|
| 5,690,417 A * | 11/1997 | Polidor | ............... | G02B 21/084 359/387 |
| 5,984,494 A * | 11/1999 | Chapman | ............... | B64D 47/04 362/240 |
| 6,322,237 B1 * | 11/2001 | Lee | ............... | B60Q 1/326 362/234 |
| 6,454,437 B1 * | 9/2002 | Kelly | ............... | G01J 3/10 359/287 |
| 6,663,260 B1 * | 12/2003 | Tieszen | ............... | G01N 21/8806 362/249.02 |
| 7,290,893 B2 * | 11/2007 | Amphlett | ............... | G03B 15/03 362/11 |
| 7,365,991 B2 * | 4/2008 | Aldrich | ............... | H05K 1/111 361/783 |
| 7,429,117 B2 | 9/2008 | Pohlert et al. | | |
| 7,690,801 B2 * | 4/2010 | Amphlett | ............... | G03B 15/03 362/3 |
| 8,901,516 B2 * | 12/2014 | Nelson | ............... | G01N 21/645 250/461.1 |
| 2005/0225980 A1 * | 10/2005 | Amphlett | ............... | G03B 15/03 362/244 |
| 2009/0091630 A1 | 4/2009 | Bollhorst | | |
| 2011/0222293 A1 | 9/2011 | Kim et al. | | |
| 2012/0063116 A1 * | 3/2012 | Baxter | ............... | F21V 29/70 362/6 |
| 2012/0257095 A1 | 10/2012 | Velazquez | | |
| 2012/0281407 A1 * | 11/2012 | Sinofsky | ............... | F21V 7/0008 362/247 |
| 2013/0100641 A1 | 4/2013 | Zhang | | |
| 2017/0119250 A1 * | 5/2017 | Kolachalama | ............... | A61B 3/10 |

OTHER PUBLICATIONS

Traders City., "Waterproof Smd Led Strip Light-enveloped By Epoxy Resin Mini-tube, Ip66", URL=<http://www.traderscity.com/board/products-1/offers-to-sell-and-export-1/waterproof-smd-led-strip-light-enveloped-by-epoxy-resin-mini-tubeip66-84445/>; Aug. 9, 2017, entire document, especially paragraph 1 and Figure.

* cited by examiner

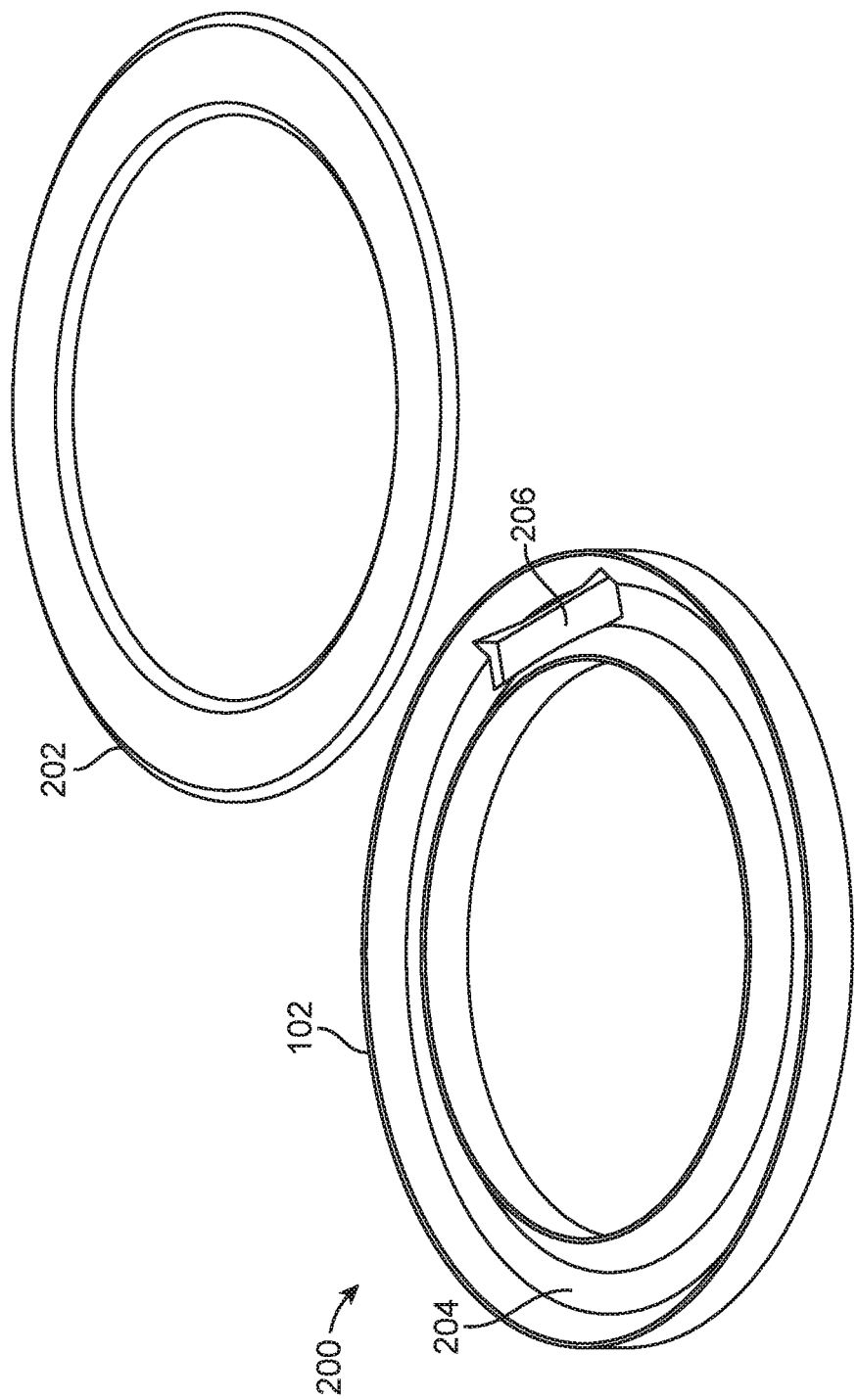

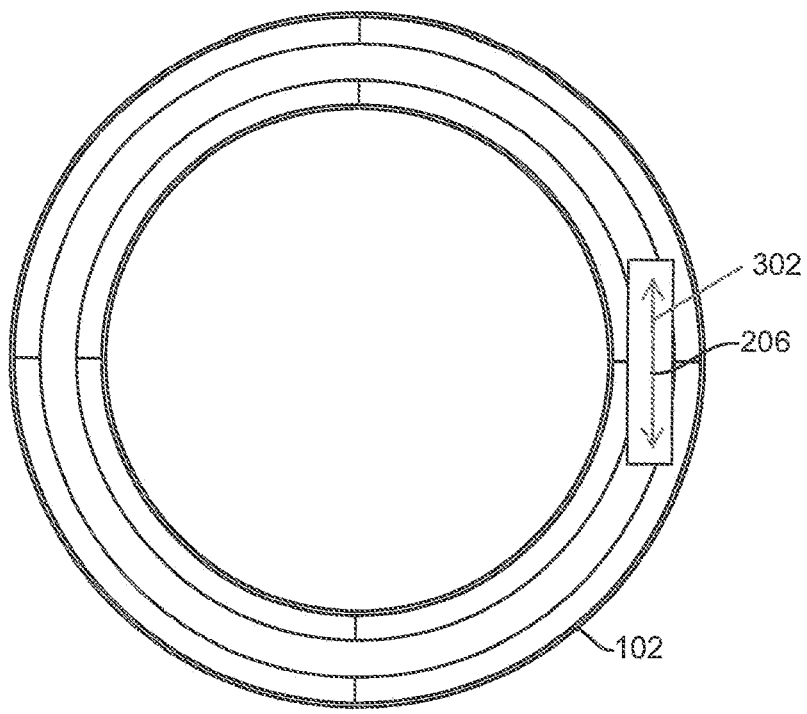
FIG. 3A
 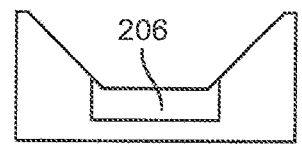
FIG. 3B   FIG. 3C

LIGHTING DEVICE AND METHOD OF USING THE SAME

CROSS-REFERENCE TO RELATED APPLICATION

The present utility patent application claims the priority benefit of the U.S. provisional application for patent Ser. No. 62/353,114 filed on Jun. 22, 2016, entitled A Lighting Device and Method of Using the Same, and is a National Stage Filing of PCT/US17/38553 entitled Lighting Device and Method of Using the Same, each of which is incorporated by reference herein for all purposes.

REFERENCE TO SEQUENCE LISTING, A TABLE, OR A COMPUTER LISTING APPENDIX

Not applicable.

FIELD OF THE INVENTION

The present invention relates generally to a lighting device. More particularly, the invention relates to a lighting device for use in cinematography, photography, and the like.

BACKGROUND OF THE INVENTION

Advances in technology has allowed lighting equipment, particularly that which is related to the motion picture and television industry, to make vast improvements over the last century. In fact, improvements in lightings technology has directly influenced film styles and expanded the range of lighting methods and effects available to cinematographers. Although certain styles of film lighting arose in response to technologies that already existed, many other technical innovations were the result of experiments by enterprising cinematographers and gaffers.

Conventional video lighting equipment can be quite heavy and thus, relatively immobile, which can cause inconvenience in operation. However, certain advances in lighting technology have, at least in part, allowed for lighting equipment to "downsize" while still retaining their lighting power and range. However, there is still room for marked improvement for reduction in weight, cost, size, light specificity, and usability.

Lighting spotlights with light-emitting diodes (LEDs) are known which are used for example as camera attachment light for film and video cameras.

For example, DE 102 33 050 A1 discloses an LED-based light source for generating white light which makes use of the principle of three-color mixing. The three primary colors red green blue (RGB) are mixed in order to generate the white light, in which case at least one blue-light-emitting LED, which is referred to as transmission LED and emits directly used light primarily in the wavelength range of from 470 to 490 nm, and also another LED, which operates with conversion and is correspondingly referred to as conversion LED and emits light primarily in the wavelength range of at most 465 nm, are combined in a housing. Disposed in front of both LEDs or a surface (array) constructed from a multiplicity of both types of LEDs is a common conversion surface composed of a potting or a glass plate with one or more luminescent materials, such that the luminescent materials completely convert the light from the conversion LED but allow the light from the transmission LED to pass through unimpeded.

Light-rings for attachment to the lens area of a camera have been developed, such as EP1072884 which describes an illuminator with a printed circuit board, supporting a ring of light emitting diodes, and an annular Fresnel lens both mounted in a housing having a central through-hole for a camera field of view.

Disadvantages of these types of known devices include heavy weight, difficulty of attachment, non-optimum color rendering, increases maintenance, difficulty in hard-wiring, and high manufacturing cost.

Accordingly, a new and improved right light device is needed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a perspective exploded view of the light device in accordance with one embodiment of the present invention as disclosed herein;

FIG. 3 is a side view of the base of the lighting device in accordance with one embodiment of the present invention as disclosed herein;

Figure 1:
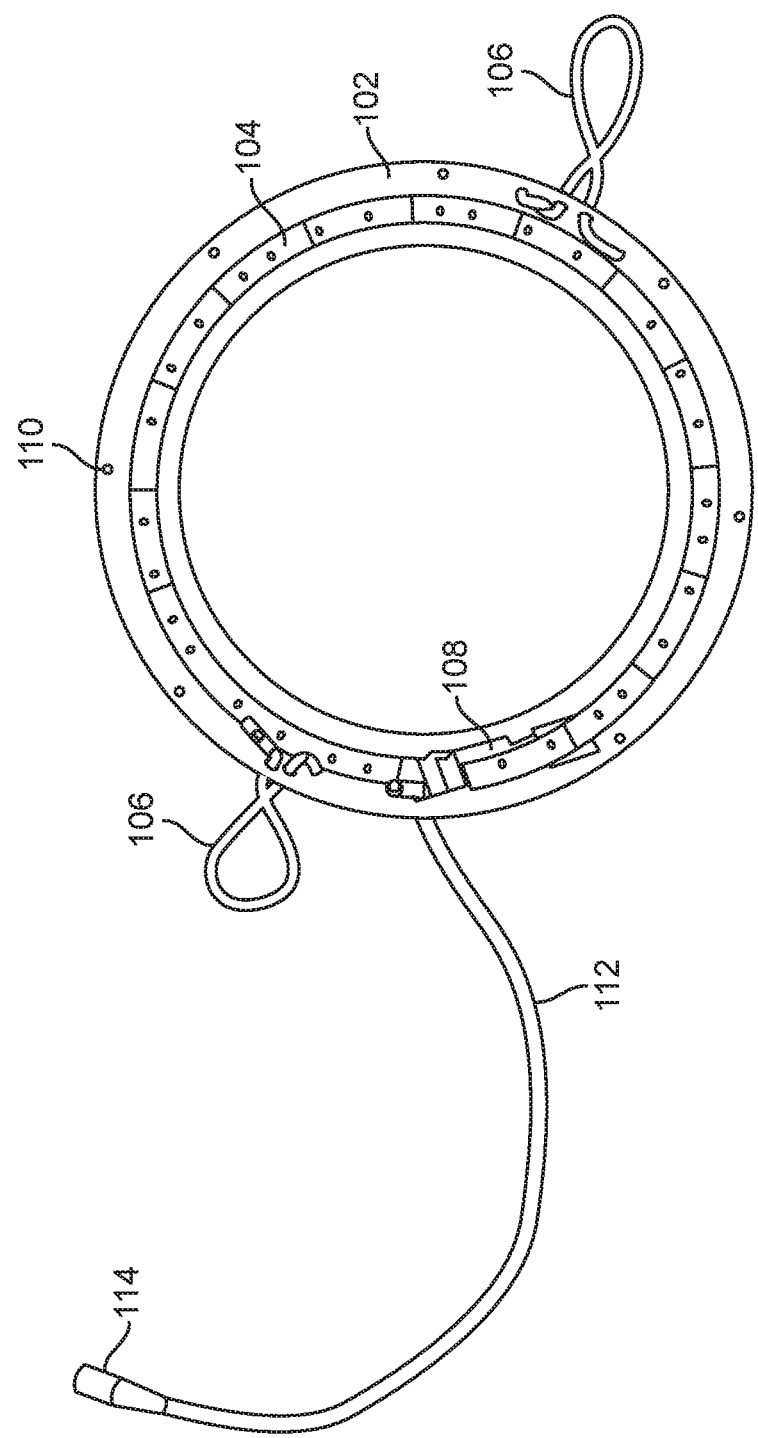
FIG. 1 is an exploded view of the lighting device in accordance with one embodiment of the present invention as disclosed herein.

Unless otherwise indicated illustrations in the figures are not necessarily drawn to scale.

SUMMARY OF THE INVENTION

To achieve the forgoing and other aspects, and in accordance with the purpose of the invention, a lighting device is presented.

Advantageously, it is an aim of the present invention to provide a lighting device that is light weight, easy to engage and disengage to a camera, provide optimum color rendering, reduce manufacturing cost while providing a wireless lighting solution.

It is an object of the present invention to provide a system and method for providing LED based white light sources for use in situations such as, but not limited to, lighting studios for film and video recording, for architectural lighting, for photographic studio special effects or some combination thereof.

It is another object of the present invention to provide LED white light sources having a stable, selectable Planckian locus location color temperatures for use in situations such as, but not limited to, video and photographic lighting to achieve desired visual effects. It is yet a further objective of the present to invention to provide white light sources having both a predetermined, stable correlated color temperature (CCT) and a high color rendering index (CRI) while being reasonably efficient, relative.

In embodiments of the present invention a lighting apparatus is provided comprising a base having a bottom and at least one sidewall, the base being generally ellipsoidal in shape and having a hollow center, the hollow center being dimensioned for a camera lens a ribbon of light emitting didoes (LEDs) affixed to the base, wherein the ribbon of LEDs are parallel the sidewall and configured for color temperature between approximately two thousand seven hundred degrees and six thousand degrees, an opaque lens coupled to the sidewall of the base, wherein opaque lens is coupled to the sidewall modularly such that a no tooling is required.

In embodiments of the present invention, a method for lighting a set for a film of video is provided, the method comprising providing a base having a bottom and at least one sidewall, the base being generally ellipsoidal in shape and having a hollow center, the hollow center being dimensioned for a camera lens, affixing a ribbon of light emitting didoes (LEDs) to the base, wherein the ribbon of LEDs are parallel the sidewall and configured for color temperature between approximately two thousand eight hundred degrees and six thousand degrees, six thousand five hundred and green shift coupling an opaque lens to the sidewall of the base, wherein opaque lens is coupled to the sidewall modularly such that a no tooling is required; attaching the light to a fixture using connection members.

The described arrangement has been advanced by explanation and many modifications may be made without departing from the spirit and scope of the invention, which includes every novel feature and novel combination of features herein disclosed.

Other features, advantages, and aspects of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed, but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, apparatuses, and materials are described, although any methods, techniques, apparatuses, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

Referring now to FIG. 1, a front view of a lighting device in accordance with one embodiment is shown generally at 100, illustrating the front of the lighting device. As shown, the lighting device is "opened up", and does not have a lens attached such that the internal components can be clearly seen and identified. As shown, the lighting device comprises a base 102, a light source 104, connectors 106, dimmer 108, fasteners 110, and chord 112.

The base 102, in some embodiments, is formed of closed-cell PVC foam board, which is a lightweight rigid material generally immune to rain, and resistant to wind and sunlight, making it a perfect choice to be used outside in the elements while filming. Due to its closed-cell foam structure, PVC foam board is very easy to cut and shape, making it ideal for fitting to different types of cameras and lens sizes. In addition, PVC foam board also has a low flammability rate, thermoplastic properties and generally does not begin to soften until 149° F. (65° C.), meaning it is a great choice for working with cameras that generate amounts of heat while being used. Because of its weather resistant properties, it will also serve as a shield of sorts to protect the front element of the image capture device it is attached to.

In optional embodiments, the base 102 may also be formed of other synthetic polymers that are light weight, easily cut and used for mounting. Other lightweight materials that may be used in optional embodiments may comprise metals such aluminum, magnesium, titanium, and beryllium alloys. Aluminum and aluminum alloys are lightweight, non-ferrous metals with good corrosion resistance, ductility, and strength. Magnesium is a very common structural metal, and is used in strong, lightweight metal and alloys. In addition, titanium is durable, light weight, as well as dent and corrosion resistant, and may be anodized to change the color of the metal but is a more expensive process to manufacture than the other potential options thereby increasing the cost of the lighting device—the increased cost may be inconsequential, however, in certain situations where the heat exposure and expected usage rate of the lighting device would suggested that the lighting device would be best if formed of the stronger titanium. In other embodiments, different types of thermoplastics may be used such as nylon, acrylic, polythene, polypropylene and resins. However, while cheaper and easier to work with, many of these thermoplastics have their own concerns—nylon is extremely flammable and thus not the best choice for exposure to constant high levels of heat; polypropylene is vulnerable to ultraviolet radiation and can degrade considerably when exposed in direct sunlight, making this not the optimal choice for outdoor applications. In optional embodiments, acrylic would be a potentially suitable alternative, as it is tough, resistant to ultraviolet rays and can be used to create a cleaner and more attractive lighting device; however, acrylic does scratch easily and is generally more susceptible to breaking and cracking than metal alternatives. Other lightweight materials may include low-density polyethylene ("LDPE"), a thermoplastic made from monomer ethylene that can withstand temperatures as high as 203° F. (95° C.), and is flexible but also light, making in another excellent choice as it will withstand the heat generated from the light and camera as well as the wear and tear that similar lighting gear normally sees. Another potential material may include high-density polyethylene ("HDPE"), a polyethylene thermoplastic made from petroleum that has an extremely good strength-to-density ratio withstand temperatures up to 248° F. (120° C.). Due to its high durability and safety, HDPE may be another preferred material to be used as it will withstand the usage it will likely be put through.

The base 102 may be configured as a reflector of light. In exemplary embodiments, the base 102 may be painted with a reflective substance, such as a silver paint, which is configured to reflect light in an outward direction. The reflective properties may be either specular or diffused, depending on the nature of the interface. In optional embodiments, and depending on the desired artistic end goal, the base 102 may be covered in a silver sheath to reflect light (e.g., paint, etc.), covered in metallic paint and metallic chips, or painted with a flat black finish to prevent any lighting reflections.

In some embodiments, optical coatings may comprise thin layers of metals, such as aluminum, which may be deposited on glass substrates to make mirror surfaces, a process known as silvering. The metal used determines the reflection characteristics of the mirror, and thus, may be predetermined or dictated by how the light is to be used. In exemplary embodiments, aluminum, which is the cheapest and most common coating yields a reflectivity of around 88%-92% over the visible spectrum, may be used. In other embodiments, silver, which has a reflectivity of 95%-99% even into the far infrared, but suffers from decreasing reflectivity (<90%) in the blue and ultraviolet spectral regions, may be used. In other optional embodiments, gold, which gives excellent (98%-99%) reflectivity throughout the infrared, but limited reflectivity at wavelengths shorter than 550 nm, resulting in the typical gold color.

By controlling the thickness and density of metal coatings, it is possible to decrease the reflectivity and increase the transmission of the surface, resulting in a half-silvered mirror.

In other exemplary embodiments, other types of optical coatings such as the dielectric coating may be used (i.e. using materials with a different refractive index to the base or substrate). These are constructed from thin layers of materials such as magnesium fluoride, calcium fluoride, and various metal oxides, which are deposited onto the optical substrate. It has been found that by using certain composition, thickness, and number of these layers, it is possible to tailor the reflectivity and transmitivity of the coating to produce almost any desired characteristic. Reflection coefficients of surfaces can be reduced to less than 0.2%, producing an antireflection (AR) coating. Conversely, the reflectivity can be increased to greater than 99.99%, producing a high-reflector (HR) coating. The level of reflectivity can also be tuned to any particular value, for instance to produce a mirror that reflects 90% and transmits 10% of the light that falls on it, over some range of wavelengths.

Referring still to FIG. 1, the base 102 may be circular or ring shaped, and have a trough or depressed region that runs throughout the inner portion of the base 102, which is shown in greater detail with relation to FIG. 2. The base 102 may have a center opening dimensioned for any type or size of camera. As an example, the opening may be 290 mm to allow it to be used with many size cinema lens. In other embodiments, a different size opening may be necessary to accompany certain camera sizes, such as a 162 mm center opening to allow usage of lenses such as the Angenieux Optimo® 24-290 mm T2.8 Zoom. In addition, further embodiments may employ a fixed center opening with the ability to employ an adapter to allow for usage of lenses with a different size center opening than the one on the lighting device.

Still referring to FIG. 1, the light source 104 is disposed of within the trough or depressed region on the base 102. In some embodiments of the present invention, the light source 104 are light emitting diodes ("LED"), a semiconductor device that emits visible light when an electric current passes through it. LEDs have many benefits over traditional incandescent and fluorescent lighting, such as having a longer life expectancy and a lower power requirement to generate a desired output, and minimize heat production. The light source 104 is affixed to the base 102 may be variable in color, adhesiveness, and water resistance. In the current embodiment, the light source 104 consists of a singular LED ribbon, also known as an LED tape or stripe light, which is a flexible circuit board filled with LEDs mounted on the surface with an adhesive component on the back of the ribbon that allows for the entire LED ribbon to be easily mounted and/or removed to various surfaces. Because surface mounted LEDs on an LED ribbon have an increased luminous efficacy and are high powered, they're well designed to be used for backlighting, accent lighting and decorative lighting. In this embodiment, their high power and luminous efficacy ratings also allow them to be used as alternatives to fluorescent and halogen lighting fixtures.

The light source 104 may be affixed to the base 102 using fixing means such as epoxy adhesives, nails, screws, rivets staples and the like. The light source 104, in some embodiments, runs the entire length or circumference of the base 102, but in others, may run only a portion of the base 102.

In the current exemplary embodiment, the light source 104 is affixed using a high performance adhesive (e.g., structural adhesives, engineering adhesives) that operates without loosing its holding properties at temperatures above 350° F.; these high-performance adhesives are commonly used in the construction of aircrafts, automobiles, bicycles, boats, skis, snowboards and other applications where high strength bonds are required and can be used as adhesives for wood, metal, glass, stone and some plastics. The light source 104 may be variable in color, adhesiveness and water resistance. high performance adhesive is a pressure-sensitive adhesive, meaning a bond will be formed by the application of light pressure that will marry the light source 104 to the base 102. The use of high performance adhesive also has the benefits of being removable to allow the light source 104 to be decoupled from the base 102 in the event that it must be removed for cleaning, maintenance or any other purpose. If removed, the ease at which the adhesive can be reapplied makes it the preferred method for securing the light source 104 to the base 102. In addition, the high performance adhesive also does not contain other metal or aluminum components much like a nail, screw or rivet may, which will help reduce any chances of interference with other electronical components of the camera lens, image capture device or that otherwise would be traditionally found on a movie set. In the preferred embodiment, the adhesive would be white or shades of white in nature, and its epoxy resin formulation acts as an electrical insulator and protects electrical components (e.g. the LED ribbon) from short circuiting, dust and moisture. In some embodiments, the base 102 may also be covered in a heat conducting epoxy to protect the circuitry from direct contact with water should the camera be required for under water applications.

The light source 104 may be, in some embodiments, runs the entire length or circumference of the base 102, but in others, may run only a portion of the base 102 depending on the specific camera, lens and lighting requirements. The LED ribbon may be single color and non-addressable such that every LED on the light source 104 is a single white color, typically ranging from 2700K to 6500K in color temperature, or any of several monochrome colors covering the range of the visible spectrum (generally from 400-700 nanometers in wavelength). A single chip may address all of the LEDs in the light source 104 at once so each setting is applied to every LED. In other embodiments, the light source 104 may be multicolor and non-addressable such that there are LEDs of different alternating fixed colors, usually red, green, blue and amber, on a single address. In other embodiments, the LEDs on the light source 104 may be red-green blue-green ("RGB") and non-addressable and be similar to the single color, non-addressable LED strand except that RGB strands have multiple colors available but the entire LED strand on the light source 104 uses the same address so all LEDs show the same color. In other embodiments, the LEDs on the light source 104 may be RGB and addressable having multiple colors and addresses. In this embodiment, each LED on the light source 104 has its own chip meaning they can be individually triggered for chasing, strobing and color changing. The light source 104 may have a driver and operate on 12 or 24 volts of direct current from the driver. As an example, the light source 104 operates on the standard 5-volt direct current used by USB devices. In optional embodiments, a controller may be provided to adjust brightness, color, or individual LED activity. This can be done with an included controller or customized with a microcontroller and dimmer, to be discussed in greater detail.

In optional embodiments, the LED ribbon on the light source 104 is circuited with every other LED being an opposite color, and on separate circuits, such that the levels of each of two circuits can mix to make a plurality of color combinations in the ring light. In addition, color gels or lens filters may be used with the LED ribbon to alter the color of the LED light emitted. These gels and filters may be formed of plastic or pre-cut gel paper shaped to the size of the camera lens to assist with changing the color of the LED output.

Furthermore, while the LED ribbon is the preferred embodiment for the light source 104, in other embodiments, and depending on the specific user's end needs (e.g., amount of light needed, intensity of light needed, brightness of light needed), the light source 104 may be a light-emitting electrochemical cell ("LEC"), a solid-state device that generates light from an electric current and is usually composed of two metal electrodes that sandwich an organic semiconductor containing mobile ions.

Figure 4:
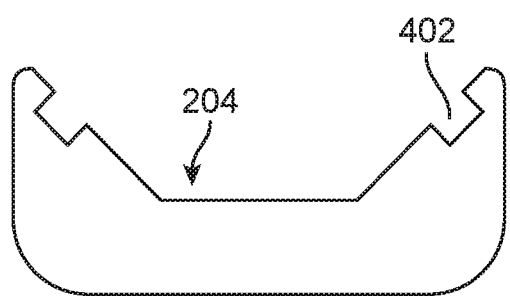
FIG. 4 is a perspective view of the lighting device attached to a camera in accordance with one embodiment of the present invention as disclosed herein.
Figure 5:
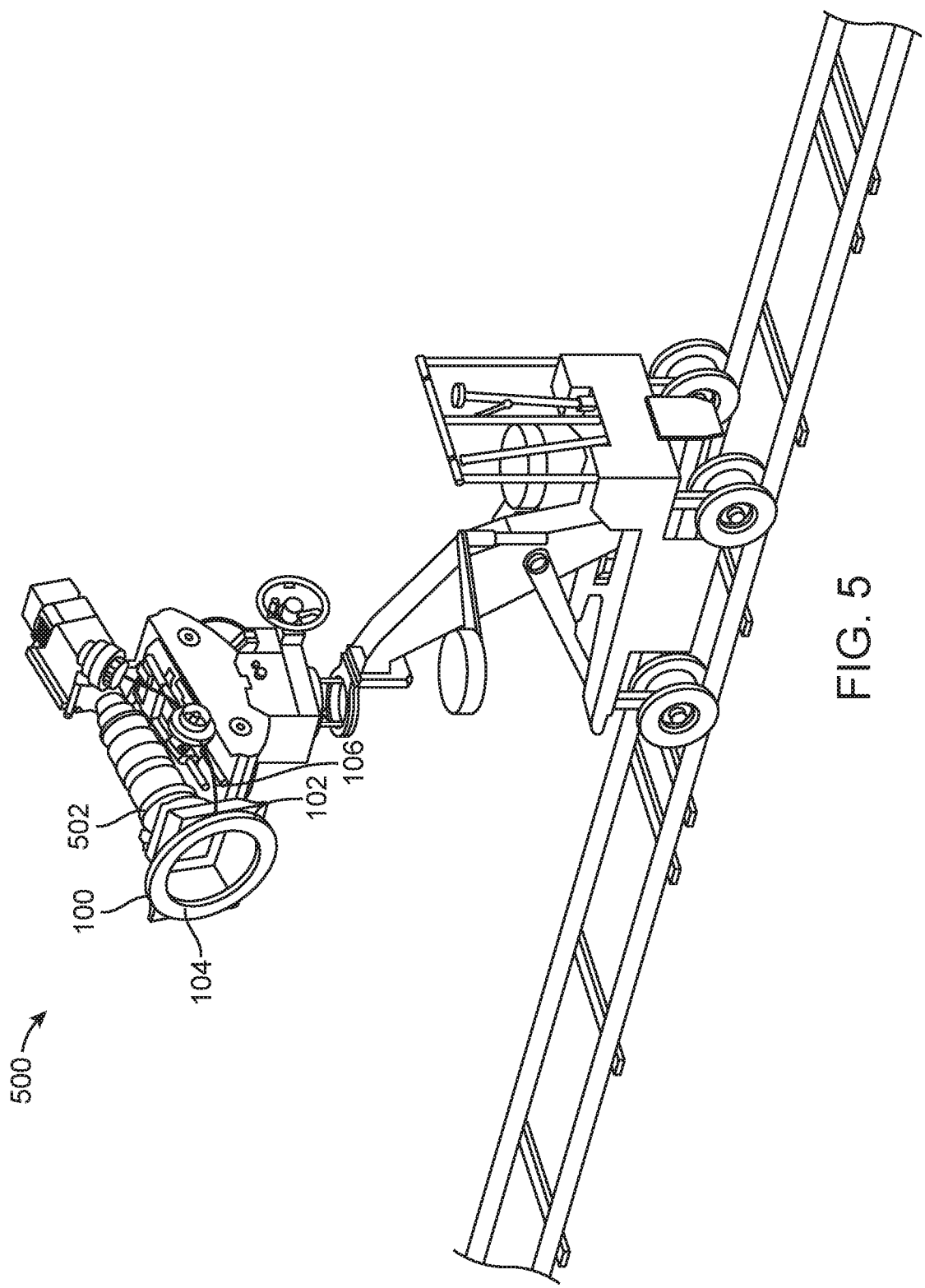
FIG. 5 is a perspective view of alternative means for attaching the lighting device attached to a camera in accordance with one embodiment of the present invention as disclosed herein.

Referring still to FIG. 1, connectors 106 are connected to the base 102 via apertures in the base 102. In other embodiments, the connectors may be fixed or fastened via known methods such as epoxy, but in others, the connectors 106 may be formed of an elastic material and may be looped so as to attach to hooks on a common cinema camera. In optional embodiments, other mounting systems may be used, which are shown with relation to FIGS. 6 and 7. FIGS. 4 and 5, and are discussed further herein in greater detail.

The base 102 may further comprise a valley (shown in FIG. 2) in which a dimmer 108 is disposed. The dimmer 108 is electrically connected to the LED ribbon and in some embodiments, a controller and power source via wire 112 and USB 114. The dimmer 108 may be hardwired or be wireless in other embodiments, with the preferred embodiment being wireless to afford the flexibility for the image capture device to travel without the hindrance of wires hanging from the base 102. The dimmer 108 is configured to cause the LED ribbon to fade up or fade down, and may be built from semiconductors or variable resistors. In a wireless setting, the dimmer may be optionally coupled to network interface which enables communication with an external devices such as a controller via communication channels, which may be implemented as a hardwired or wireless communications link using suitable conventional technologies. With such a connection, communication via remote connectivity including, but not limited to the Internet, Satellite networks, Cell Phone networks, other wireless networks and standards such as 802.11, 80211.b, 802.11g, or similar wireless LAN operating standards, or Bluetooth technologies, infrared connections, or any other similar technologies or other technologies such as those described above that permit the sending and/or receiving and/or processing of electronic information in either an encrypted or unencrypted format.

A dedicated controller to control the light wirelessly, in some embodiments, may be provided. In other embodiments, wireless control may be provided via download of a mobile application downloaded on to a smart phone, personal computers, workstation, or other similar type of devices capable of processing instructions and receiving and transmitting data to and from other computing devices, which will be discussed with relation to FIG. 8.

While the current embodiment shows the lighting device as ring-shaped, in optional embodiments the lighting device may be oval, square, rectangle or any shape that is convenient for use with an image capture device.

Referring now to FIG. 2 the base 102 is shown uncoupled to the light source cover 202. For perspective purposes, the trowel 204 and valley 206 are shown in the base 102. The fasteners 110 of FIG. 1 are configured to connect the light source cover 202 to the base 102. These fasteners 110 may, in some embodiments, comprise magnets for weight reduction and easy coupling and uncoupling. Other connection means may comprise clamps, wire clasps, clips, screws, and the like.

In some embodiments, the camera light source lens 202 may be formed of white plexiglass (also known as milkplex), and may be in some embodiments 3/16 of an inch think. The light source cover 202 may be formed of other materials or be thinner or thicker based on lighting requirements (e.g., softer light). Plexiglass is a transparent thermoplastic often used as a lightweight and shatter-resistant alternative to glass, that is easy to handle and process, and is also low in cost. When extreme strength is necessary then polycarbonate be used instead of plexiglass. In optional embodiments, the light source cover 202 may comprise glass, and be ground and/or polished. The type of light source cover 202 may be dictated by the particular usage.

In option embodiments, the lighting source cover 202 may be comprised of polycarbonate, a thermoplastic polymer containing certain carbonate groups that create strong and tough materials that may be optically transparent. In addition, polycarbonate is easy to work with at room temperature and can be molded to fit many different shapes without cracking or breaking, accounting for any possible size variances in the light source 104. Polycarbonate can withstand temperatures up to 297 degrees Fahrenheit so as to obviate issues with the cover melting or otherwise disfiguring as a result of the heat generated from the light source 104. In optional embodiments, a variety of thermoplastics may be employed as the lighting source cover 202, including polylactide (a biodegradable thermoplastic aliphatic polyester derived from renewable resources), polyether sulfone (a class of specially engineering thermoplastics with high thermal, oxidative and hydrolytic stability that is often used for 3D printing), polyetherether ketone (a material that has good abrasion resistance, low flammability and resistance to high temperature steam) and acrylonitrile butadiene styrene (a light-weight material that exhibits high impact resistance and mechanical toughness, and is often times used in many consumer products, such as toys, appliances, and telephones). In certain embodiments, it is also possible that the lighting source cover 202 may be made of laminated glass, a type of safety glass that holds together when shattered due to an interlayer (typically polyvinyl butyral or ethylene-vinyl acetate) held between two or more layers of glass; this makes laminated glass an excellent choice to be used on locations where the lighting source cover 202 will be exposed to the elements and may be damaged. The ability to not shatter would allow the end user to potentially keep operating the lighting device without fear of having to stop, check for damage and/or clear up an area of broken glass to ensure no other individual is hurt. This added peace of mind may be worth it to certain end users who are operating camera devices in environments with many people and moving objects, where the margin for error is high.

Referring now FIG. 3, the base 102 is shown together with the valley 206. The dimensions, in one embodiment, are listed therein. The primary profile of the trowel and the valley is also shown at 204 and 206, respectively. The arrow 302 shows the adjustability of the valley 206, which can adjust laterally to fit different size dimmers, controllers, and the like. In optional hard wired embodiments, the valley 206 may be larger in size than for wireless embodiments due to decreased hardware requirements.

Referring now to FIG. 4, FIG. 3 is generally reproduced, except the magnet holes are now shown at 402. The magnet holes 402 function to reduce the profile of the light, and reduce weight as well. The magnets on the base 102 are made of a ferromagnetic material in such that the force attracts the opposite magnet on the light source cover 202, and a strong type of magnetic bond. An example of a potential ferromagnetic materials includes iron, nickel, cobalt, and certain types of stainless steel.

Referring now to FIG. 5, the preferred method for connecting the lighting device to the camera 502 is shown generally at 500. This preferred method is lightweight, strong, weather resistant and cost efficient for the end user. The preferred method also allows for the lighting device to be easily removed for storage and transportation purposes, or for coupling to another image capture device. The camera 502 itself, while illustrated as a motion picture camera, may be embodied as any other type of camera or image capture device, whether an analog or digital camera or one that is capable of capturing photography stills and/or video. As such, the camera 502 may use different means to store and/or playback any material recorded, including but not limited to, film or solid state image capture circuitry, and may be either a still photography camera or a camera capable of recording footage.

Still referring to FIG. 5, the preferred method of attaching the lighting device to the connectors 106 utilizing bungee cables to couple the lighting device to the side brow tie down knob on the camera is shown. In this embodiment, bungee cables are used to couple the lighting device to the connectors 106 but in alternative embodiment and depending on the end user's purpose and intent of purchasing the lighting device, the lighting device may be permanently coupled to the mounting rods 602. In other optional embodiment, hook and loop fasteners such Velcro® may be used for purposes of attachment.

Figure 6:
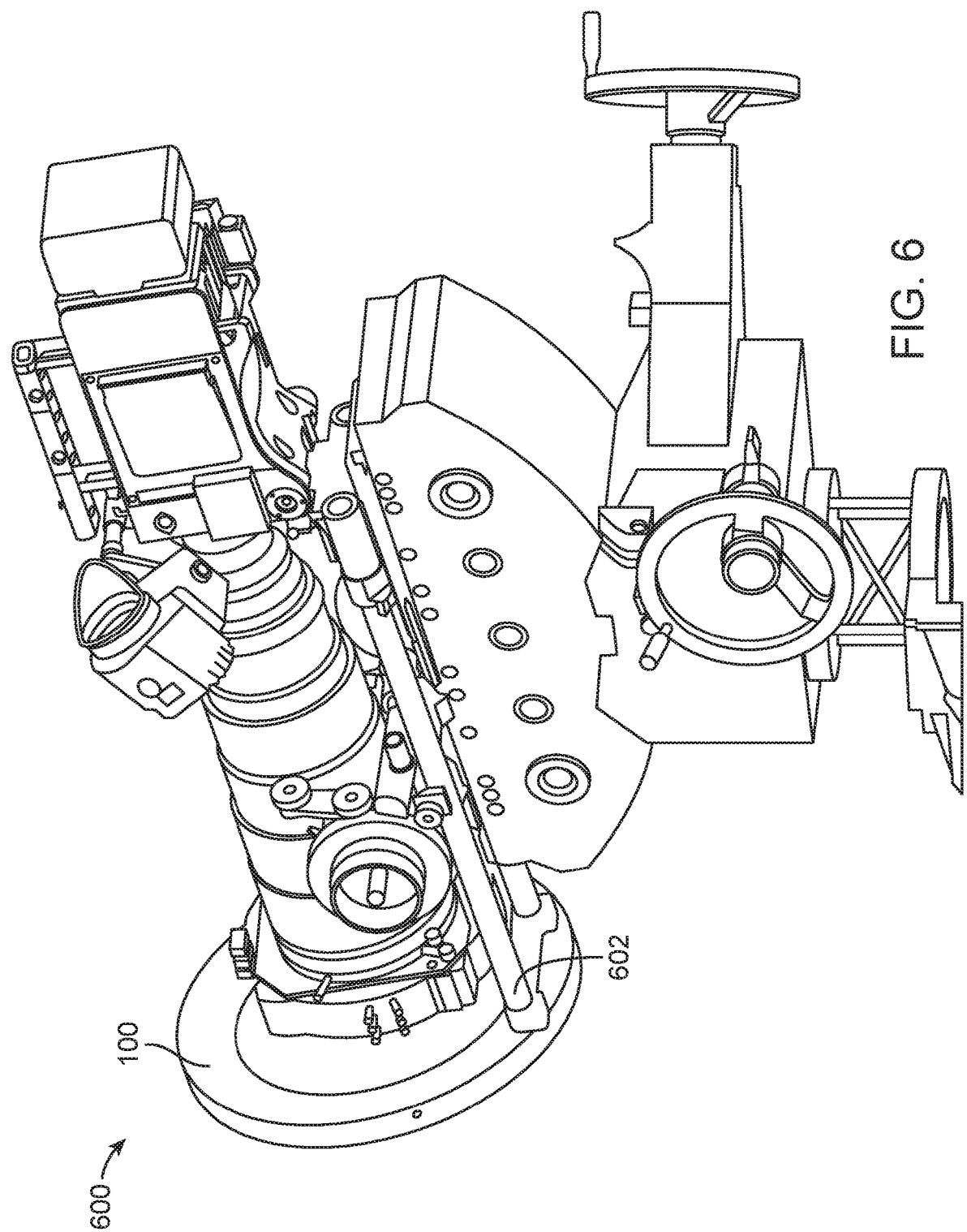
FIG. 6 is a perspective view of another alternative means for attaching the lighting device attached to a camera in accordance with one embodiment of the present invention as disclosed herein.

Referring now to FIG. 6, an alternative embodiment showing how the lighting device 100 may be coupled to a camera is presented generally 600. In this alternative embodiment, a plurality of mounting rods 602 may be coupled to the side of the camera and allow for the lighting device 100 to be coupled to the mounting rods 602 by sliding the lighting device 100 onto the mounting rods 602. The mounting rods may be coupled to a camera or other image capture device through the use of pre-existing features on the camera or lighting device. In other instances, the mounting rods could be permanently affixed to a camera or other image capture device through the use of epoxy or another fastening method such as welding. It should be many cameras and rod mount options are on the bottom of the camera, or the top of the camera only, on occasion. Because these rods vary in diameter, (e.g., 15 mm and 19 mm), and vary in spread distances from one another, referred to as "Lightweight Rods" (i.e., narrower distance apart) or "Studio Rods" (i.e., further distance apart), the attachment members 106 may be adjustable in nature, or different types of brackets may be used such that they can attach to both lightweight 15 mm brackets and studio 19 mm brackets. In this embodiment, the brackets slide onto a rail bolted to the back of body of the ring. It can be, for example, a NATO Rail, and utilize various interchangeable brackets.

Depending on the type of camera or image capture device, other methods may be utilized to couple the lighting device to the camera or image capture device instead of the mounting rods 602; however, the current embodiment has the advantage of being non-cost prohibitive, lightweight and can be used with various different image capture devices. In other embodiments, custom mounting rods or attachment devices may be fabricated directly onto the image capture device to couple the lighting device to the camera or image capture device.

Figure 7:
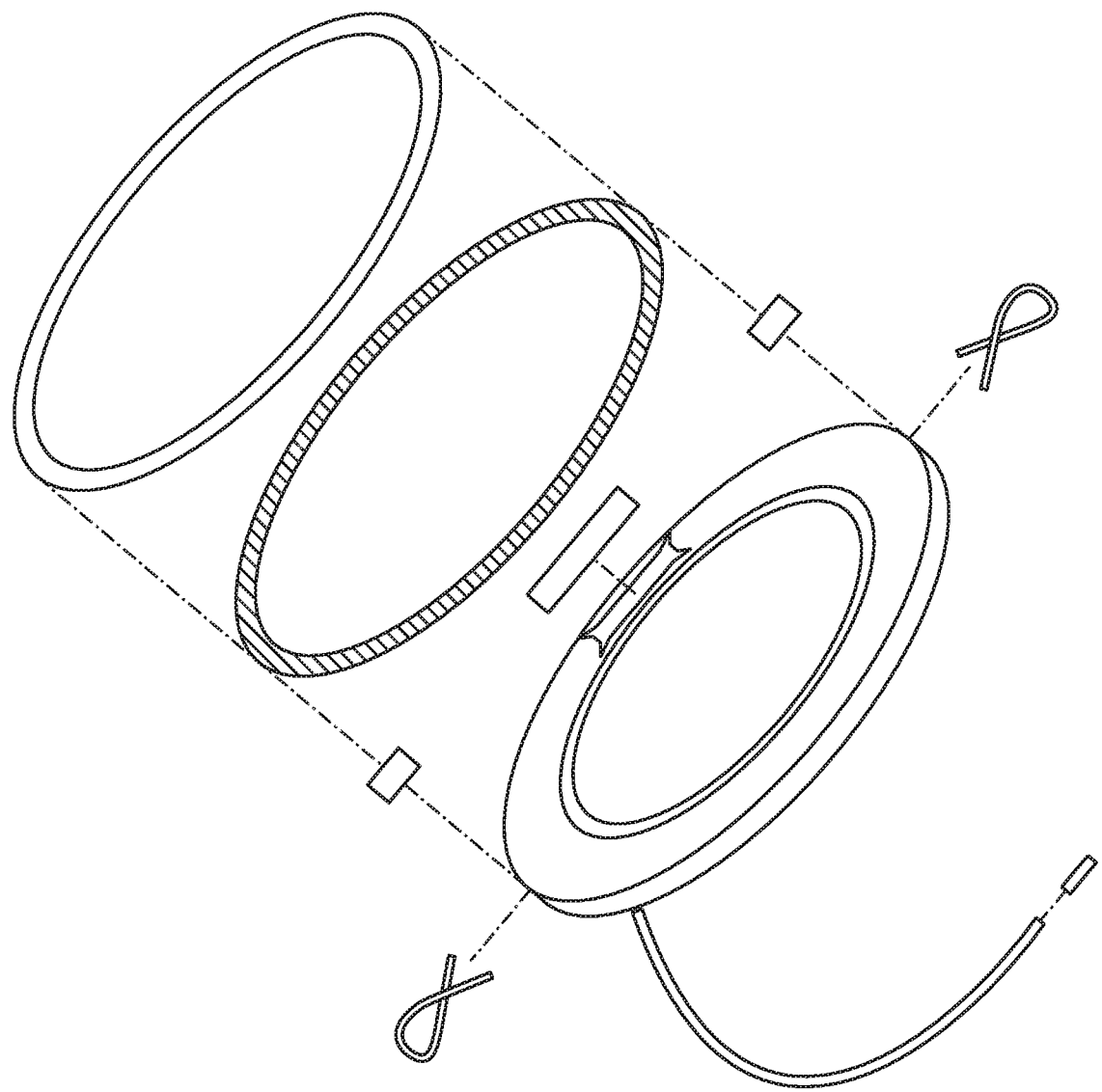
FIG. 7 is an exploded view of the lighting device in accordance with one embodiment of the present invention as disclosed herein.

Referring now to FIG. 7, an exploded view of the lighting device in accordance with one embodiment of the present invention. The light source cover 202 is coupled over the light source 104, and is used to shield the light source 104 from damage, debris or anything else that may cause unwanted artifacts in or otherwise obstruct the light emitted from the light source 104. The base 102 is shown with a trough or pressed region that runs throughout the inner portion as well as a valley in which the dimmer 108 is disposed. The light source 104 and the light source cover 202 are then coupled to the base 102 by using the fasters 110. The base 102 is then coupled to the camera device using the connectors 106. Also shown is the wire 112 and USB 114 that can be used at times to connect to an external controller and power source to both power the lighting device as well as to control the intensity and/or temperature of the light emitted from the light source 104. For example, power may be supplied by 2.1 mm barrel connector for 12V, but may vary according to need.

Figure 8:
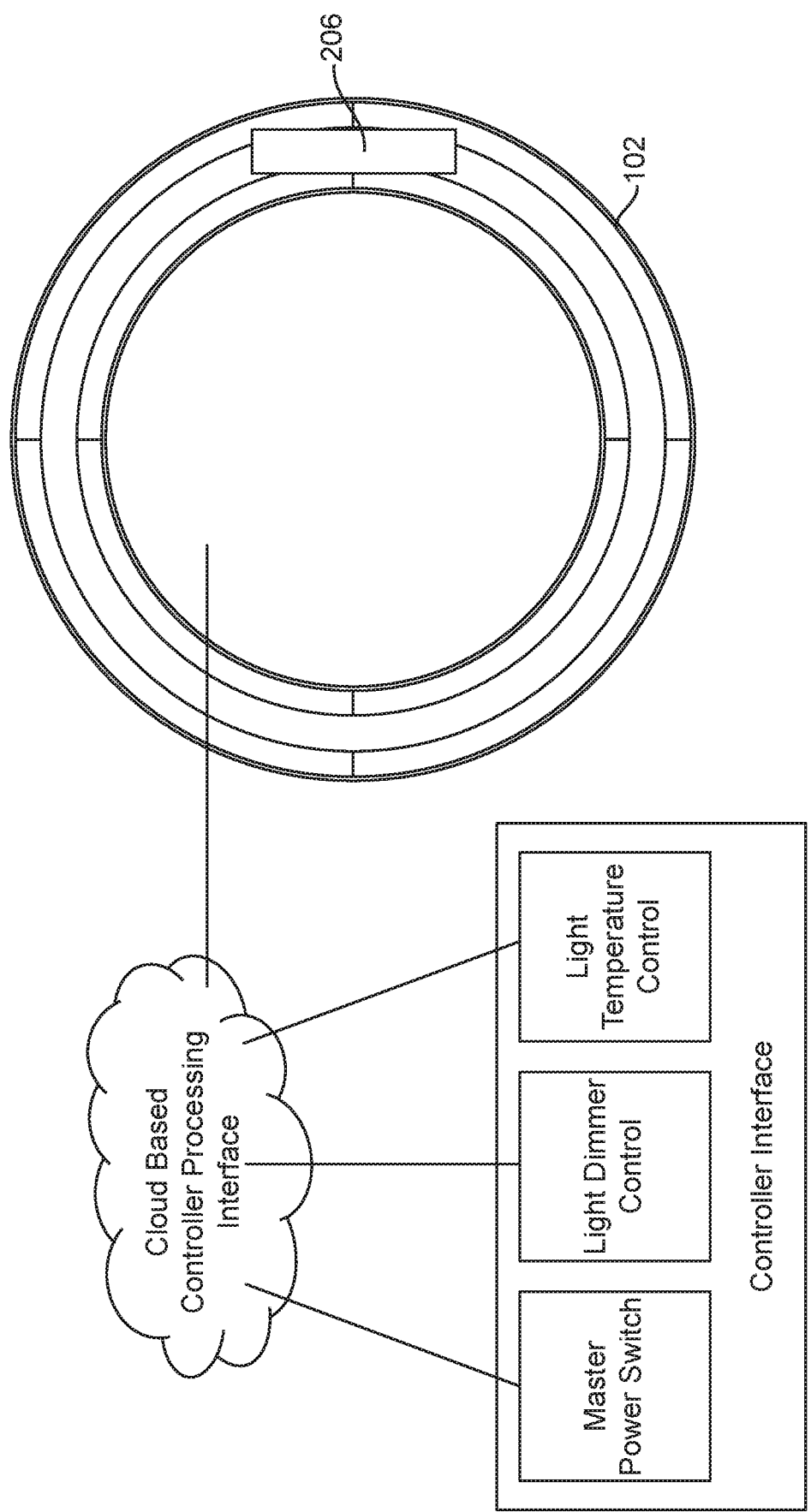
FIG. 8 is a block diagram illustrating one type of controller interface that may be employed, for example, with controller processing interface in one embodiment of the present invention as disclosed herein.

Referring now to FIG. 8, a block diagram of a system architecture is shown generally at 800. In this system, the light 100 is connected to a controller 802 via a wireless network 804. In this wireless setting, the dimmer may be optionally coupled to network interface which enables communication with an external devices such as a controller 802 via communication channels. With such a connection, communication via remote connectivity including, but not limited to the Internet, Satellite networks, Cell Phone networks, other wireless networks and standards such as 802.11, 80211.b, 802.11g, or similar wireless LAN operating standards, or Bluetooth technologies, infrared connections, or any other similar technologies or other technologies such as those described above that permit the sending and/or receiving and/or processing of electronic information in either an encrypted or unencrypted format.

The dedicated controller 802 may be provided a power switch 806, dimmer control 808 and light temperature control 810 to control the light wirelessly, in some embodiments, may be provided. In other embodiments, wireless control may be provided via download of a mobile application downloaded on to a smart phone, personal computers, workstation, or other similar type of devices capable of processing instructions and receiving and transmitting data to and from other computing devices.

Figure 9:
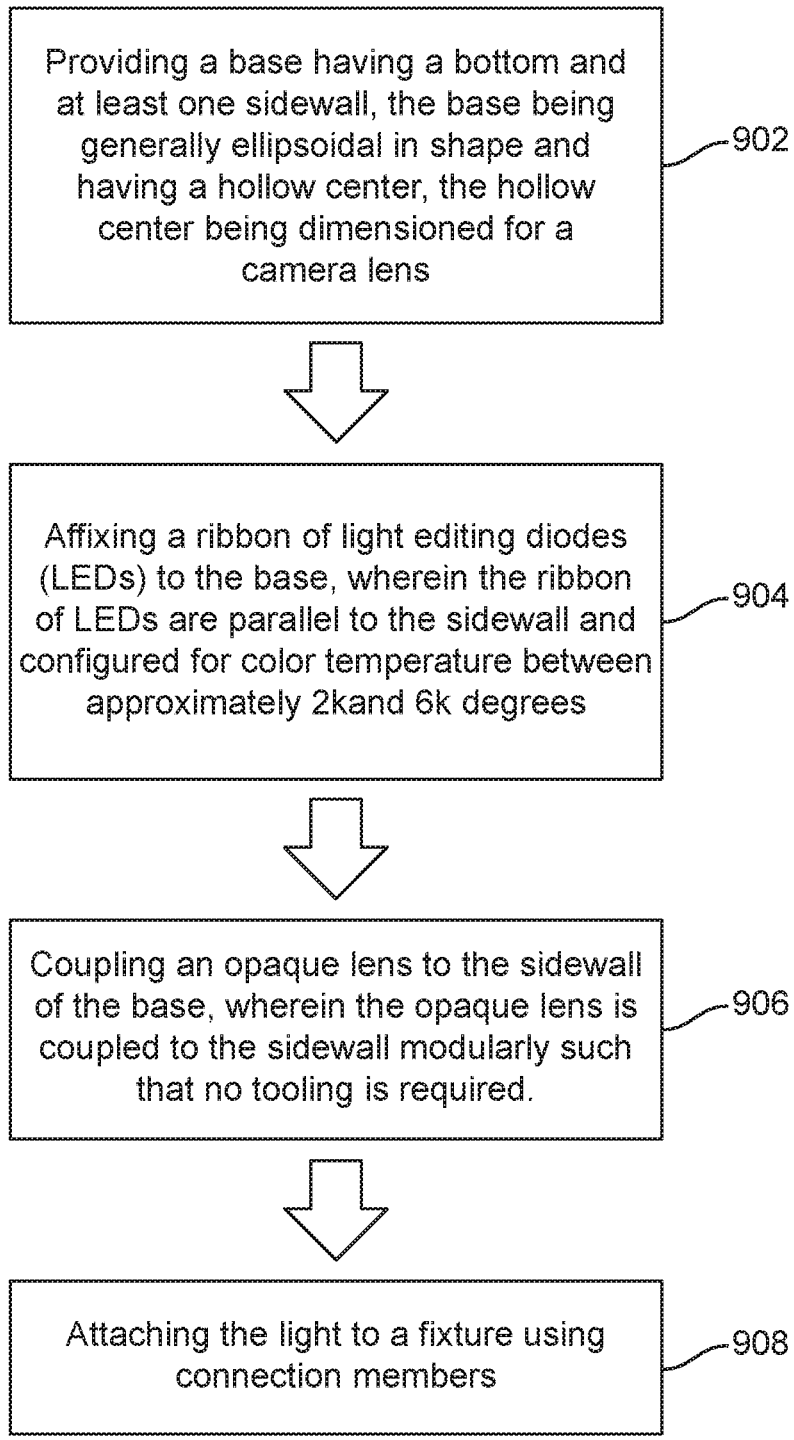
FIG. 9 illustrates the method for using a lighting device in accordance with one embodiment of the present invention one embodiment as disclosed herein.

Referring now to FIG. 9, a general overview of a method for using a lighting device 102. In block 902 a base is provided, having a bottom and at least one sidewall, the base being generally ellipsoidal in shape and having a hollow center, the hollow center being dimensioned to be coupled with a camera lens.

In block 904, a ribbon of light emitting didoes (LEDs) are affixed to the base, wherein the ribbon of LEDs are parallel the sidewall and configured for color temperature between approximately two thousand seven hundred degrees and six thousand degrees.

In block 906 an opaque lighting device lens is coupled to the sidewall of the base, wherein the opaque lighting device lens is coupled to the sidewall modularly such that a no tooling is required.

In block 908, the lighting device is coupled to a camera device using connection members.

Operationally, the lighting device may weigh approximately 14.2 oz. for wireless and 14.6 oz. for local control and have an LED color range is 2700-6500 degrees kelvin with a CRI average of 95-96.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with", as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

We claim:

1. A lighting device comprising:
   a base formed as a trough having a bottom and at least one sidewall, the base having a hollow center, the hollow center being dimensioned for a camera lens;
   a singular ribbon of light emitting diodes (LEDs) coupled to the base, wherein the ribbon of LEDs run the entire circumference of the base and each of the LEDs on the ribbon of LEDs comprise its own processing chip coupled to a controller, wherein each of the LEDs on the singular ribbon are configured to be individually triggered by the controller for chasing, strobing, color changing, brightness changing, or any combination thereof, and wherein each of LEDs on the singular ribbon are configured for color temperature between approximately two thousand seven hundred degrees Kelvin and six thousand degrees Kelvin;
   a lighting device cover coupled to the sidewall of the base, wherein lighting device cover is coupled to the sidewall modularly such that no tooling is required; and
   an adjustable valley configured as a depression and positioned in the trough and configured to adjust in size so that the adjustable valley accepts and holds firm internal electronic components of varying dimensions.

2. The lighting apparatus of claim 1, further comprising magnets or hook and loop fasteners attached to each of the base and the cover, and configured to couple and decouple the base and cover.

3. The lighting apparatus of claim 1, wherein the base is formed from Polyvinyl chloride (PVC) foam comprising a reflective coating formed therein at least on the base, sidewall, or both.

4. The lighting apparatus of claim 3, wherein the reflective coating comprises silvering materials formed from metals, paints, chips, or a combination thereof, wherein the silvering materials function to lower signal loss reflection.

5. The lighting apparatus of claim 1, wherein the electronic components comprise a dimmer, the controller, a driver, a wireless controller or any combination thereof.

6. The lighting apparatus of claim 1, further comprising a heat conducting epoxy enveloping the LED ribbon, wherein the heat conducting epoxy configured to protect LED circuitry from direct contact with atmosphere, water and other elements.

7. The lighting apparatus of claim 1, wherein each of the LEDs in the LED ribbon are a single color and each is non-addressable such that every LED of the LED ribbon is a single white color having a range from approximately 2700K to 6500K in color temperature.

8. The lighting apparatus of claim 1, wherein each of the LEDs in the LED multicolor is addressable such that each of LEDs in the LED ribbon are configured for different alternating fixed colors.

9. The lighting apparatus of claim 1, wherein the driver is in communication with the LED ribbon and configured to operate on twelve or twenty-four volts of direct current from the driver; and wherein the controller configured to adjust brightness, color, or individual LED activity wirelessly.

10. The lighting apparatus of claim 1, wherein each of the LEDs of the LED ribbon is circuited with every other LED to be opposite color and on separate circuits, such that levels of each of two circuits can mix to make a plurality of color combinations lighting apparatus.

11. The lighting apparatus of claim 1, wherein the apparatus is adapted for being mounted to and to disengage from a camera using a connection element, wherein the connection element comprises an elastic band configured to hook to a cinema camera.

12. A method for lighting a set for a film of video, the method comprising:
providing a base formed as a trough having a bottom and at least one sidewall, the base having a hollow center, the hollow center being dimensioned for a camera lens;
affixing a singular ribbon of light emitting diodes (LEDs) to the base, wherein the ribbon of LEDs run the entire circumference of the base and each of the LEDs on the ribbon of LEDs comprise its own processing chip coupled to a controller, wherein each of the LEDs on the singular ribbon are configured to be individually triggered by the controller for chasing, strobing, color changing, brightness changing, or any combination thereof, and wherein each of LEDs on the singular ribbon are and configured for color temperature between approximately two thousand seven hundred degrees and six thousand degrees;
adjusting a dimension of a valley configured as a depression and positioned in the trough to accept and hold firm internal electronic components of varying dimensions;
coupling a light source cover to the sidewall of the base, wherein the light source cover is coupled to the sidewall modularly such that a no tooling is required;
attaching the light to a fixture using connection members.

13. The method of claim 12, wherein coupling the light source cover to the base comprises using magnets or hook and loop tags.

14. The method of claim 12, wherein the base is formed from PVC foam.

15. The method of claim 12, further comprising applying a reflective coating, the reflective coating comprising silvering materials formed from metals, paints, or both, wherein the silvering materials have a low signal loss reflective finish.

16. The method of claim 12, wherein the electronic components comprise a dimmer, the controller, a driver, a wireless controller or any combination thereof.

17. The method of claim 12, further comprising applying a heat conducting epoxy to envelope the LED ribbon, the heat conducting epoxy configured to protect LED circuitry from direct contact with water and other elements.

18. The method of claim 12, further comprising adjusting the brightness, color, or individual LED activity wirelessly using a driver.

19. The method of claim 12, wherein each of the LEDs in the LED multicolor is addressable such that each of LEDs in the LED ribbon are configured for different alternating fixed colors.

20. The method of claim 12, wherein attaching the lighting device to a fixture using connection members comprises attaching a hook and loop fastener to a mount on the fixture.

\* \* \* \* \*